June 4, 1929.　　　W. E. SMITH　　　1,715,476
CIRCUIT CONTROLLER

Filed July 12, 1926

INVENTOR:
W. E. Smith,
by A. R. Vencill
His Attorney

Patented June 4, 1929.

1,715,476

UNITED STATES PATENT OFFICE.

WILLIAM E. SMITH, OF PITTSBURGH, PENNSYLVANIA, ASSIGNOR TO THE UNION SWITCH & SIGNAL COMPANY, OF SWISSVALE, PENNSYLVANIA, A CORPORATION OF PENNSYLVANIA.

CIRCUIT CONTROLLER.

Application filed July 12, 1926. Serial No. 122,021.

My invention relates to circuit controllers, and particularly to circuit controllers of the type comprising a shaft mounted to oscillate, and a plurality of contact units mounted on the shaft. One feature of my invention is the provision of means for adjusting the angular position of any one contact unit without disturbing the adjustment of the others.

I will describe two forms of circuit controller each embodying my invention, and will then point out the novel features thereof in claims.

Figure 2:
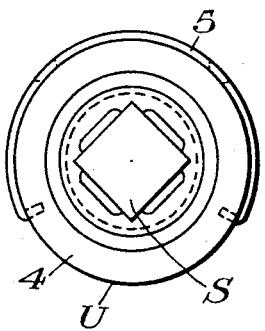
Figure 1:
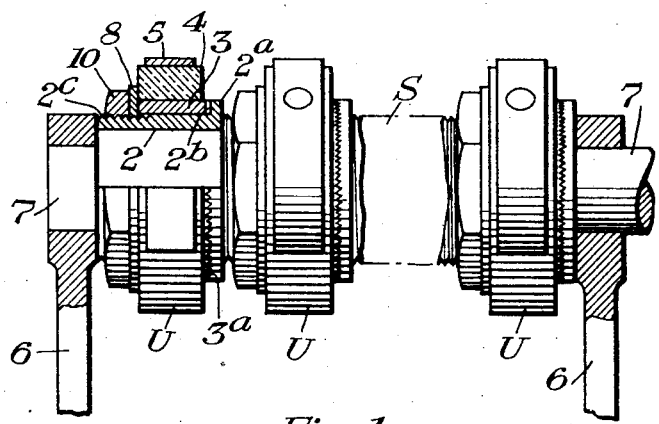
Figure 3:
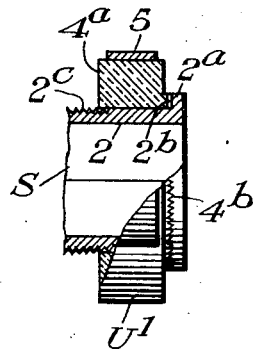

In the accompanying drawing, Fig. 1 is a view partly in elevation and partly in section, showing one form of circuit controller embodying my invention. Fig. 2 is an end view of one of the units U of a circuit controller shown in Fig. 1. Fig. 3 is a fragmentary view showing a modification of the circuit controller shown in Fig. 1.

Similar reference characters refer to similar parts in each of the views.

Referring to the drawing, the reference character S designates a shaft the main portion of which is square in cross-section but the ends 7 of which are circular whereby the shaft is mounted to oscillate in suitable supports 6. The shaft may be oscillated by any suitable means not shown in the drawing. The shaft S carries a plurality of circuit controller units U each of which is constructed as follows:

Each unit U comprises a bushing 2 having a square hole fitting the squared portion of the shaft S, whereby the bushing is fixed with respect to the shaft. One end of this bushing 2 is provided with a shoulder $2^a$ having serrations $2^b$ on its inner surface, and the other end of the bushing is provided with screw threads $2^c$. Mounted to rotate freely on the bushing 2 is a sleeve 3, and the end of this sleeve which is adjacent to the shoulder $2^a$ is provided with serrations $3^a$ co-operating with the serrations on the shoulder. The sleeve 3 is held in adjusted position on the bushing 2 by means of a nut 10 operating on the screw threads $2^c$, a lock washer 8 preferably being interposed between the nut and the sleeve 3. Fixed on the sleeve 3 is an annular member 4 of insulating material, and on the periphery of the member 4 is a contact band 5 arranged to co-act in the usual manner with contact fingers which are not shown in the drawing.

In order to adjust the position of the contact band 5 of any unit U it is only necessary to back off the nut 10 of such unit, turn the sleeve 3 until the contact band occupies the desired angular position, and again tighten up the nut 10, whereupon the sleeve 3 and contact band will remain fixed in their adjusted position with respect to the shaft, because of the co-action between the serrations $3^a$ on the sleeve 3 and the serrations $2^b$ on the bushing 2.

If desired, the sleeve 3 can be omitted as shown in Fig. 3, and the insulation member, here designated $4^a$, may be provided with serrations $4^b$ co-operating with the serrations $2^b$ on the shoulder of the bushing 2, it being understood that, of course, the member $4^a$ is of such size as to turn freely on the main body of the bushing 2. In other respects the unit $U^1$ of Fig. 3 is the same as the unit U of Fig. 1.

Although I have herein shown and described only two forms of circuit controller embodying my invention, it is understood that various changes and modifications may be made therein within the scope of the appended claims without departing from the spirit and scope of my invention.

Having thus described my invention, what I claim is:

1. A circuit controller comprising a shaft mounted to oscillate, a bushing fixed to said shaft and having a shoulder on one end and screw threads on the other end, the inner surface of said shoulder being serrated, a sleeve fitting rotatively on said bushing and provided at one end with serrations co-operating with the serrations on the shoulder of the bushing, a nut on the threaded portion of the bushing to clamp the sleeve against the shoulder of the bushing in adjusted position, and a contact band carried by said sleeve.

2. A circuit controller comprising a shaft mounted to oscillate, a bushing fixed to said shaft and having a shoulder on one end and screw threads on the other end, the inner surface of said shoulder being serrated, a sleeve fitting rotatively on said bushing and provided at one end with serrations co-operating with the serrations on the shoulder of the bushing, a nut on the threaded portion of the bushing to clamp the sleeve against the shoulder of the bushing in adjusted position, an annular member of insulation fixed to said sleeve, and a contact band on the periphery of said insulation member.

In testimony whereof I affix my signature.

WILLIAM E. SMITH.